Aug. 1, 1961 R. W. BROWN 2,994,820
INSULATION FAULT LOCATOR
Filed June 4, 1958
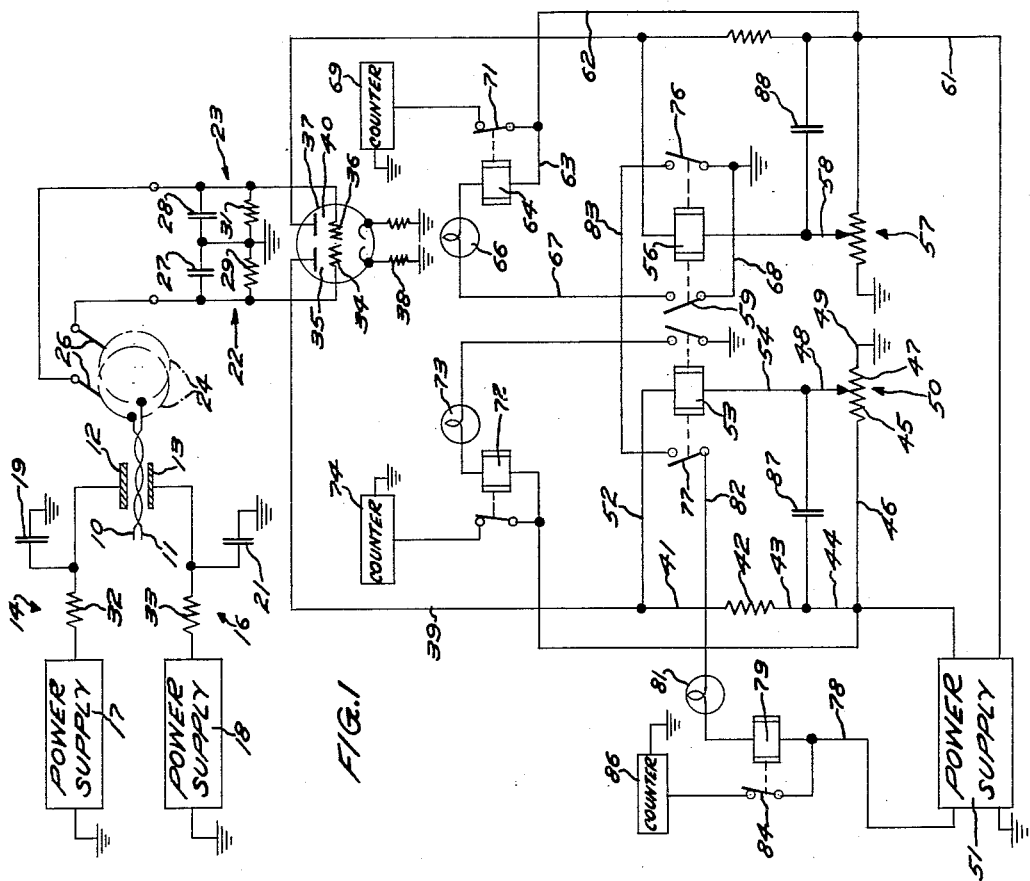
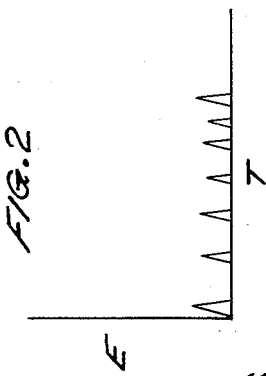
INVENTOR
R.W. BROWN
BY R.P. Miller
ATTORNEY

United States Patent Office 2,994,820
Patented Aug. 1, 1961

2,994,820
INSULATION FAULT LOCATOR
Raymond W. Brown, Evergreen Park, Ill., assignor to Western Electric Company, Incorporated, New York, N.Y., a corporation of New York
Filed June 4, 1958, Ser. No. 739,779
9 Claims. (Cl. 324—54)

This invention relates to an apparatus for detecting faults in an insulated wire, or more particularly to an apparatus for detecting and registering individual and coincident faults in a twisted pair of wires.

Many types of testing apparatus are known in the prior art for detecting and registering insulation faults in an insulated wire. These tests, however, which are made on individual wires are not sufficient if the wires are to be further processed wherein additional faults may be produced in the insulation. This mode of testing single insulated wires or conductors is especially insufficient where two wires are twisted into pairs and the twisted pair used, for example, in a telephone circuit. If such a process is to be performed upon the individual wires, it then becomes necessary to determine, not only the number and location of faults in the individual wires of the pair, but also whether or not the faults in the individual wires occur sufficiently close to one another to cause short circuiting between the wires. The coincident faults, that is, the faults on the individual wires which coincide, must be detected and such coincident faults removed. Telephone circuits are susceptible to high voltages from lightning strokes or from adjacent high tension lines. Repeated sparking through an insulation fault in the wires from such high voltages burns the insulation from the wire in the vicinity of the faults, and if two such faults are near one another, short circuiting of the telephone circuit may occur.

It is therefore an object of this invention to provide a new and improved apparatus for detecting insulation faults.

A further object of this invention is to provide an apparatus for detecting and registering individual faults in a twisted pair of wires.

A still further object of this invention is to provide an apparatus for detecting and locating both individual and coincident insulation faults in a travelling twisted pair of wires.

With these and other objects in view the present invention contemplates an apparatus which will detect and locate individual and coincident faults in a twisted pair of insulated wires or conductors. A pair of storage circuits having a D.C. source of potential connected thereto are connected to a pair of spaced electrodes for accumulating a D.C. potential charge and applying the charge to the electrodes. One end of each wire in the twisted pair is connected to a second storage circuit by means of slip rings and brushes on a take-up reel for winding the twisted pair. A pair of Wheatstone bridge type circuits each having a triode in one arm thereof, are connected to the second storage circuits by means of the control grids within the triodes. Upon an insulation fault in one of the wires passing the electrodes, the charge thereon arcs through the fault to transmit pulses through the wire to the associated second storage circuit which receives the pulses and accumulates a charge therein. This accumulated charge is placed on the control grid of the triode thereby rendering the triode more conductive to unbalance the bridge circuit. A relay is placed in the null sensitive arm of the bridge which may be used to register and locate the fault in the insulation. The two bridge circuits are then interconnected to register simultaneous unbalanced conditions therein to register and locate coincident faults in the twisted pair.

Other objects, advantages and novel features of the invention will become apparent upon consideration of the following detailed description, in conjunction with the accompanying drawings wherein:

FIG. 1 discloses a circuit for detecting faults in one or another or both of a pair of twisted wires in accordance with the principles of the present invention.

FIG. 2 discloses a wave form of pulses which are transmitted along a wire containing an insulation fault.

FIG. 3 illustrates the accumulation of a charge in a storage circuit connected to a wire having insulation fault.

Attention is now directed to FIG. 1 wherein a circuit is shown which is capable of detecting, locating and registering both individual and coincident faults in a twisted pair of insulated wires. A twisted pair of insulated wires 10 and 11 are pulled between a pair of plate electrodes 12 and 13 by means of a take-up reel (not shown). The electrodes 12 and 13 are connected to a pair of storage circuits 14 and 16 which in turn are connected to respective D.C. sources of potential 17 and 18. The D.C. sources of potential, or power supplies, 17 and 18 place D.C. potential on the circuits 14 and 16 which is accumulated or stored in capacitors 19 and 21. As the capacitors 19 and 21 are connected directly to the electrodes 12 and 13, the charge on the capacitors is likewise applied to the electrodes.

The ends of twisted pair of wires 10 and 11 are connected to a second pair of storage circuits 22 and 23 by means of slip rings 24 and brushes 26 on the take-up reel (not shown). The second storage circuits 22 and 23 are connected to ground potential. A pair of capacitors 27 and 28 within the storage circuits 22 and 23, receive the pulses transmitted along the twisted pair and accumulate a charge larger in amplitude than any one pulse transmitted through the twisted pair. The capacitors 27 and 28 store a series of pulses transmitted through the twisted pair because these capacitors have larger capacitance values than the capacitors 19 and 21. The RC time constant of the circuits 22 and 23, determined by the capacitor 27 and a resistor 29, the capacitor 28 and a resistor 31, respectively, is larger than the time constant of the circuits 14 and 16 determined, respectively, by the capacitor 19 and a resistor 32, and the capacitor 21 and a resistor 33.

Upon a fault existing in the insulation in one of the wires 10 or 11 passing the electrodes, a plurality of pulses will be transmitted along the wire because the time constant of circuits 14 and 16 is sufficiently small to enable the capacitors 19 and 21, and thereby electrodes 12 and 13, to charge and discharge through the insulation fault a plurality of times before the fault is pulled from between the electrodes. The charging and discharging of the electrode will produce pulses of a type shown in FIG. 2 and, although slightly varied in amplitude and pulse frequency, the amplitudes will be within a predetermined range defined by the size of capacitors 19 and 21 and the pulse frequencies will be within a predetermined range determined by the RC time constant of the circuits. The amplitudes and pulse frequencies vary due to the variations in the dielectric path between the wires and the electrodes as the wires move therebetween. As the capacitance of the capacitors 27 and 28 and the time constants of the circuits 22 and 23 are larger than the capacitance of the capacitors 19 and 21 and the time constants of circuits 14 and 16 the occurrence of a fault in one of the wires results in a charge successively building up on the capacitor 27 or 28 in stepped increments as illustrated in FIG. 3.

The second storage circuits 22 and 23 are constructed such that the capacitors 27 and 28 therein become fully charged upon receiving a number of pulses which will be transmitted through the wires 10 and 11 upon each insulation fault passing the electrodes. Two insulation faults in one of the wires 10 or 11 may be considered as a single fault, if the faults are sufficiently close together so that the capacitors 27 and 28 can not discharge between fault occurrences. The sensitivity of the circuit to the detection of separate spaced faults may be regulated by varying the length of the electrodes 12 and 13, the time constants of the circuits 14 and 16, the time constants of the circuits 22 and 23 and the speed at which the twisted pair is moved between the electrodes. The circuit components may likewise be varied to determine the distance between insulation faults in the individual wires 10 and 11 before such faults are considered to be coincident.

Assuming, for example, that an insulation fault exists in the wire 10, then a plurality of charges placed on the electrodes 12 and 13 will arc through the insulation fault to transmit pulses of the type shown in FIG. 2 along the wire 10. These pulses will flow through the wire 10, the slip ring 24, the brush 26 connected to the wire 10, and to the storage circuit 23 where the pulses will be accumulated on capacitor 28 as a charge of the type shown in FIG. 3, which will, in turn, flow to ground as the capacitor 28 discharges. As there is no direct current path to the storage circuit 22, the only direct current received by this circuit will be the leakage current through the capacitance presented between the wires of the twisted pair. This small amount of leakage current will not cause a charge to build up on capacitor 27 in the circuit 22 because the capacitance between the twisted pair will be introduced into the circuit 22 in series with the capacitor 27. This increase in capacitance in the circuit 22 will lower the RC time constant of the circuit and thereby prevent an accumulation of charge on the capacitor 27 of the type shown in FIG. 3.

A portion of the D.C. pulses flowing through wire 10 will flow through the capacitance presented by the twisted pair, and will cause an A.C. current to flow in the wire 11. This A.C. current will not effect the storage circuit 22, in that, the current will flow directly to ground through capacitor 27.

The pulsing circuits 22 and 23 are connected to a pair of control grids 34 and 36 within a pair of triodes 35 and 40 contained in a single envelope 37. Each of the triodes 35 and 40 is connected in one arm of a balanced Wheatstone bridge type circuit. The bridge circuit that is connected to the storage circuit 22 consists of the following four arms: arm 1, a cathode resistor 38, the triode 35 and a conductor 39; arm 2, a conductor 41, a resistor 42, and conductors 43 and 44; arm 3, a conductor 46 and a resistor 45 which comprises that portion of a variable resistor 50 to the left of a movable contact 48; and arm 4 a resistor 47 comprising a portion of resistor 50 to the right of the movable contact 48 and a conductor 49. The power is supplied across the bridge circuit by a power supply 51 between the intersection of the conductors 44 and 46 and the ground connection of the conductor 49 and the cathode resistor 38. The null sensitive arm of the bridge may now be seen to consist of a conductor 52, a coil of a relay 53, a conductor 54 and the movable contact 48. A similar bridge circuit may be traced around triode 40 which has the control grid 36 connected to the pulsing circuit 23 and has a relay 56 connected in the null sensitive arm thereof.

The parameters of each bridge circuit are selected to allow the bridge to be in the balanced or near balanced condition when there is no charge on the capacitors 27 and 28 connected thereto. In this balanced condition, the triodes 35 and 40 are only partially conducting, thereby acting as a variable resistance which may be controlled by the potential placed on the grids 34 and 36 by means of circuits 22 and 23. A fine balancing of each bridge may be obtained through the variable resistances 50 and 57 and the movable contacts 48 and 58 to control the sensitivity of the relays 53 and 56 in the null sensitive arms of the bridges.

Operation

Assuming that a fault in the insulation of wire 10 passes closer to the electrode 12 than electrode 13, arcing occurs between the electrode 12 and the fault and pulses of the type shown in FIG. 2 will flow through the wire 10 to the circuit 23 wherein the pulses will be stored to build up a charge on capacitor 28. When the fault is closer to the electrode 13, arcing occurs from this electrode and again a train of pulses passes through wire 10 resulting in additional charges being placed on the capacitor 28. As the charge on capacitor 28 builds up, the same charge will be placed on control grid 36 of triode 40 thereby increasing the conduction through the triode and decreasing the amount of resistance presented by the triode 40. This decrease of resistance will cause an unbalanced condition in the bridge which in turn causes a greater current flow in the relay 56. The increased current flow culminates in the operation of the relay 56, thereby closing the contact 59 to complete a circuit to energize relay 64 from the power supply 51 through the conductors 61, 62 and 63, the coil of relay 64, the indicating lamp 66, the conductor 67, the contact 59, and the conductor 68 to ground.

Energization of the relay 64 pulls up a contact 71 to open a current path to a counter or register 69. The opening of the current path to the counter 69 causes the counter to register the fact that one insulation fault in the conductor 10 has passed the electrodes 12 and 13. It will be understood that the relay 64 may be used to operate any type of mechanism which will register the number of insulation faults in the conductor 10 or operate a mechanism which will stop the reeling of the twisted pair of wires so that the insulation fault may be repaired. The bridge containing the triode 35 will operate in a similar manner upon a charge building up on capacitor 27 to actuate a relay 72, illuminate an indicating lamp 73 and actuate a counter 74.

From the preceding discussion it may be understood that individual faults in a twisted pair of wires may be located and registered. If faults on wires 10 and 11 coincide, or are positioned a sufficient distance to one another to cause short circuiting between the wires if the insulation around the faults were burnt away, both the relays 53 and 56 in the two bridge circuits will be operated simultaneously to close a contact 76 associated with relay 56 and a contact 77 associated with relay 53. When both contacts 76 and 77 are closed a current path is completed from the power supply 51 through the conductor 78, the relay 79, an indicating lamp 81, a conductor 82, the contact 77, a conductor 83 and the contact 76 to ground whereby the relay 79 is operated to open a contact 84 to register the coincident faults on a counter 86. As in relation to counter 69, the counters 74 and 86 may likewise be any type of electrical or mechanical registration device and may be used to stop the reeling of a twisted pair. The counters may also be connected to register a plurality of faults upon many closely spaced faults or a bare section of wire, passing the electrodes, or may be connected to register only one fault.

A pair of capacitors 87 and 88 are inserted into the bridge circuits to insure the operation of relays 53 and 56, and consequently, relays 64 and 72. In the bridge connected to the storage circuit 22, the current in arm 3, that is, the arm comprising of the conductor 46 and the resistor 45, will have an instantaneous surge of additional current upon the triode 35 becoming more conductive. This additional instantaneous current will flow from the arm 3 of the bridge through the null sensitive arm because of the decrease in potential across triode 35, which causes a greater potential difference across the relay 53. To maintain this potential difference across the null sensitive arm and therefore to prevent an immediate readjustment of the currents with the bridge, the capacitor 87 is connected across arm 3 to delay an immediate change of potential at the intersection of the null sensitive arm and arm 3 of the bridge, for a sufficient length of time to insure the operation of relay 53. The capacitor 88 serves a similar purpose within the bridge connected to the storage circuit 23.

It is to be understood that the above-identified operation, arrangements of apparatus and construction of elemental parts are simply illustrative of the application of the principles of this invention and many other modifications may be made thereto without departing from the scope and spirit of the invention.

What is claimed is:

1. An apparatus for detecting coincident insulation faults in a twisted pair of wires comprising an electrode, means for moving the twisted pair past said electrode, a storage circuit connected to said electrode and having a D.C. potential source connected thereto for storing a potential charge and applying the charge to the electrode whereby an insulation fault passing the electrode causes the charge to arc through the fault and transmit pulses through the wire, circuit means connected to each wire for sensing the pulses transmitted through the wire connected thereto and registering the number of faults in the insulation of each wire, and means including a portion of each circuit means for registering the coincident operation of the circuit means.

2. An apparatus for detecting coincident insulation faults in a twisted pair of wires comprising a pair of spaced electrodes, a first storage circuit having a D.C. source of potential and connected to each electrode for storing a potential charge and applying the charge to the electrodes, means for moving the wires between said electrodes whereby an insulation fault passing therebetween causes the charge to arc through the fault to transmit pulses through the wires, a second storage circuit connected to each wire for receiving pulses from the first circuits and storing a predetermined charge for every fault in the wire connected thereto passing the electrodes, a sensing means connected to each second circuit for registering the predetermined charges produced thereby, and means including portions of said sensing means for registering coincident registrations of the sensing means.

3. In an apparatus for detecting coincident insulation faults in a twisted pair of wires, an electrode, a resistance-capacitance network connected to said electrode and having a source of D.C. potential connected thereto, said network having a predetermined RC time constant for storing potential charges and applying the charges to the electrodes, means for moving the wires past said electrodes whereby an insulation fault passing therebetween causes the charges to arc through the fault to transmit pulses along the wires, a resistance-capacitance storage circuit connected to each wire for storing the pulses transmitted along the wire connected thereto and accumulating a predetermined charge for every fault passing the electrode, said resistance-capacitance storage circuit having an RC time constant that is larger than the RC time constant of the resistance-capacitance network, a sensing means connected to each storage circuit for registering the predetermined charges accumulated thereby, and means including portions of said sensing means for registering the coincident registrations of the sensing means.

4. In an apparatus for registering individual and coincident faults in a twisted pair of wires, a pair of first resistance-capacitance networks each having a D.-C. source of potential connected thereto, said networks having a predetermined RC time constant for storing a potential charge, a pair of spaced electrodes each connected to one of said first networks and having the charge applied thereto, means for moving the twisted pair between said electrodes whereby an insulation fault passing therebetween causes the charge to arc through the fault to transmit pulses along the wire, a second resistance-capacitance network connected to each wire, said second networks having a larger RC time constant than the first networks for storing said first pulses and accumulating a predetermined charge for every fault in the wire connected thereto passing the electrodes, a sensing means connected to each second network for registering the number of predetermined charges, and means including portions of said sensing means for registering the coincident registrations of the sensing means.

5. An apparatus for registering coincident insulation faults in a twisted pair of wires comprising a pair of spaced electrodes, a first storage circuit connected to each electrode and having a D.C. source of potential connected thereto for storing potential charges and applying the charges to the electrodes, means for moving the twisted pair between said electrodes whereby an insulation fault passing therebetween causes the charge to arc through the fault to transmit pulses along the wire, a second storage circuit connected to each wire for storing said first pulses and accumulating a predetermined charge for every fault passing the electrodes, a pair of balanced bridge networks having an electron tube in one arm thereof, said tubes having control grids therein connected to respective second storage circuits for rendering the tubes more conductive to unbalance said bridges upon the accumulation of the predetermined charges, means within said bridge circuits for registering unbalanced conditions, and means including portions of said bridge circuits for registerng coincident unbalanced conditions in the bridges.

6. In an apparatus for registering individual and coincident faults in a twisted pair of wires, a pair of first resistance-capacitance networks each having a D.-C. source of potential, said networks each having a predetermined RC time constant for storing a potential charge, a pair of spaced electrodes each connected to one of said first networks and having the charges applied thereto, means for moving the twisted pair between said electrodes whereby an insulation fault passing therebetween causes the charges to arc through the fault to transmit pulses along the wire, a second resistance-capacitance network connected to each wire, said second networks having larger RC time constants than the first networks for storing the first pulses and accumulating predetermined charges for every fault passing the electrode, a pair of balanced bridge networks having an electron tube in one arm thereof, said tubes having a control grid therein connected to respective second networks for rendering the tubes more conductive to unbalance said bridges upon the accumulation of the predetermined charges, means within said bridge circuits for registering an unbalanced condition in said bridges, and means including portions of said bridge circuits for registering coincident unbalanced conditions in the bridges.

7. In apparatus for detecting faults in one of a plurality of moving adjacent insulated wires, an electrode, a source of potential, a first resistance-capacitance network connected intermediate the electrode and the potential source said first network having a predetermined RC time constant, means for moving the wires past said electrode so that each insulation fault passing the electrode allows charges to arc from the electrode through the fault and transmit a plurality of pulses through the associated wire, a second resistance-capacitance network connected to each wire and having an RC time constant sufficiently larger than the time constant of the first network that the pulses transmitted through wire containing faulty insulation are stored in said second network until a predetermined accumulated charge is attained, and means for indicating said predetermined accumulated charge whereby to determine which of said wires contains the insulation fault.

8. In an apparatus for selectively detecting faults in a plurality of adjacent insulated wires, the combination which comprises a pair of electrodes, a source of potential, a first pair of resistance-capacitance networks connected intermediate the potential source and the electrodes, said first networks having a predetermined RC time constant, means for moving the wires past the electrodes so that each insulation fault passing the electrodes allows charges to arc from the electrodes through the fault and tansmit a plurality of pulses through the associated wire, a second resistance-capacitance network connected to each wire, said second network having a sufficiently larger RC time constant than the constant of either of said first networks that pulses transmitted through wire containing faulty insulation are stored in said second network until a predetermined accumulated charge is attained, and means associated with each of said second networks for registering said predetermined accumulated charge.

9. In an apparatus for detecting substantially coincident insulation faults in a twisted pair of insulated wires, the combination which comprises a potential source, an electrode, a first resistance-capacitance network interconnecting said electrode and said potential source, said first network having a predetermined RC time constant, means for moving the twisted pair of wires past said electrode so that insulation faults passing said electrode permit charges to arc from the electrode through said insulation faults and transmit a plurality of pulses through the corresponding wires being tested, a pair of second resistance-capacitance networks, each of said second networks being connected to a different wire being tested, said second networks each having an RC time constant sufficiently larger than the time constant of the first network that the pulses transmitted through wire being tested are stored in said second networks until a predetermined accumulated charge is attained, and indicating means associated with said second networks to detect substantially coincident insulation faults, said indicating means being rendered operative when there is attained said predetermined accumulated charge in said second networks due to substantially coincident insulation faults in the tested wires.

References Cited in the file of this patent

UNITED STATES PATENTS

| | | |
|---|---|---|
| 2,270,732 | Jones | Jan. 20, 1942 |
| 2,324,835 | Hagenguth | July 20, 1943 |
| 2,440,283 | Levy | Apr. 27, 1948 |
| 2,522,151 | Weeks | Sept. 12, 1950 |
| 2,532,336 | Rufolo | Dec. 5, 1950 |
| 2,594,595 | Stearns | Apr. 29, 1952 |
| 2,701,336 | Anderson | Feb. 1, 1955 |

FOREIGN PATENTS

| | | |
|---|---|---|
| 681,779 | Great Britain | Oct. 29, 1952 |